(12) United States Patent  
Worsham, II et al.

(10) Patent No.: US 9,193,450 B2
(45) Date of Patent: Nov. 24, 2015

(54) SYSTEM AND METHOD FOR AUTOMATION OF ROTORCRAFT ENTRY INTO AUTOROTATION AND MAINTENANCE OF STABILIZED AUTOROTATION

(71) Applicant: Bell Helicopter Textron Inc., Forth Worth, TX (US)

(72) Inventors: Robert Earl Worsham, II, Weatherford, TX (US); John Joseph Schillings, Fort Worth, TX (US); Charles Eric Covington, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 181 days.

(21) Appl. No.: 13/767,188

(22) Filed: Feb. 14, 2013

(65) Prior Publication Data

US 2013/0221153 A1  Aug. 29, 2013

Related U.S. Application Data

(60) Provisional application No. 61/602,847, filed on Feb. 24, 2012.

(51) Int. Cl.
*B64C 27/00* (2006.01)
*B64C 27/04* (2006.01)
(Continued)

(52) U.S. Cl.
CPC ............. *B64C 27/006* (2013.01); *B64C 27/04* (2013.01); *B64C 27/57* (2013.01); *G05D 1/0858* (2013.01)

(58) Field of Classification Search
CPC .... B64C 27/57; B64C 27/605; B64C 27/006; B64C 27/04; G05D 1/0858

USPC ...................................... 244/17.13; 701/4–10
See application file for complete search history.

(56) References Cited

U.S. PATENT DOCUMENTS 4,454,754 A * 6/1984 Zagranski et al. ......... 73/112.01
7,223,071 B2 5/2007 Certain
(Continued)

FOREIGN PATENT DOCUMENTS

| CA | 2478535 A1 | 10/2003 |
|---|---|---|
| EP | 1544102 A1 | 6/2005 |
| GB | 2192163 A | 1/1988 |

OTHER PUBLICATIONS

European Search Report in related European Application No. 13156353.8 dated Jan. 31, 2014, 7 pages.
(Continued)

*Primary Examiner* — Nicholas McFall
(74) *Attorney, Agent, or Firm* — Noah A. Tevis

(57) ABSTRACT

The system is configured for automation of rotorcraft entry into autorotation. The system can provide a means to assist the flight crew of a rotorcraft in maintaining rotor speed following loss of engine power. The system can automatically adjust control positions, actuator positions or both to prevent excessive loss of rotor speed upon initial loss of engine power before the flight crew is able to react. The system uses model matching to provide axis decoupling and yaw anticipation; it includes pitch control initially to assist in preventing rotor deceleration; and it makes use of collective, pitch, roll and yaw trim functions to provide tactile cueing to the pilot to assist when the pilot is in the loop. The system can reduce workload by assisting the crew with controlling rotor speed and forward speed during stabilized autorotation.

10 Claims, 4 Drawing Sheets

(51) Int. Cl.
*B64C 27/57* (2006.01)
*G05D 1/08* (2006.01)

(56) References Cited

U.S. PATENT DOCUMENTS

| 7,931,231 | B2 | 4/2011 | Cherepinsky et al. | |
|---|---|---|---|---|
| 2004/0010354 | A1 | 1/2004 | Nicholas et al. | |
| 2004/0093130 | A1* | 5/2004 | Osder et al. | 701/3 |
| 2005/0135930 | A1* | 6/2005 | Certain | 416/30 |
| 2007/0164167 | A1* | 7/2007 | Bachelder et al. | 244/220 |

OTHER PUBLICATIONS

European Office Action in related European Application No. 13156353.8 dated Oct. 10, 2014, 6 pages.

Canadian Office Action in related Canadian Application No. 2,807,019 dated Jul. 15, 2014, 2 pages.

\* cited by examiner

SYSTEM AND METHOD FOR AUTOMATION OF ROTORCRAFT ENTRY INTO AUTOROTATION AND MAINTENANCE OF STABILIZED AUTOROTATION

BACKGROUND

1. Technical Field

The present disclosure relates in general to a system and method of flight control of a rotorcraft. More specifically, the present disclosure relates to a system and method for automation of a rotorcraft entry into autorotation and maintenance of stabilized autorotation.

2. Description of Related Art

A traditional method of dealing with autorotation relies on pilot recognition of the engine failure and subsequent pilot action to reduce the collective pitch rapidly in order to preserve main rotor RPM to allow for a controlled rate of descent and maintenance of sufficient rotor kinetic energy to slow the rate of descent prior to landing and cushion the landing. Also, pilot manipulation of the cyclic may be required, depending on the aircraft dynamics and the flight condition, to initially maintain rotor speed and subsequently adjust forward speed for maximum efficiency. Previous rotorcraft systems have used engine data and rotor speed measurements to trigger warnings to assist the flight crew in recognizing the condition. Significant room for improvement remains in the field of flight control systems for rotorcraft.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
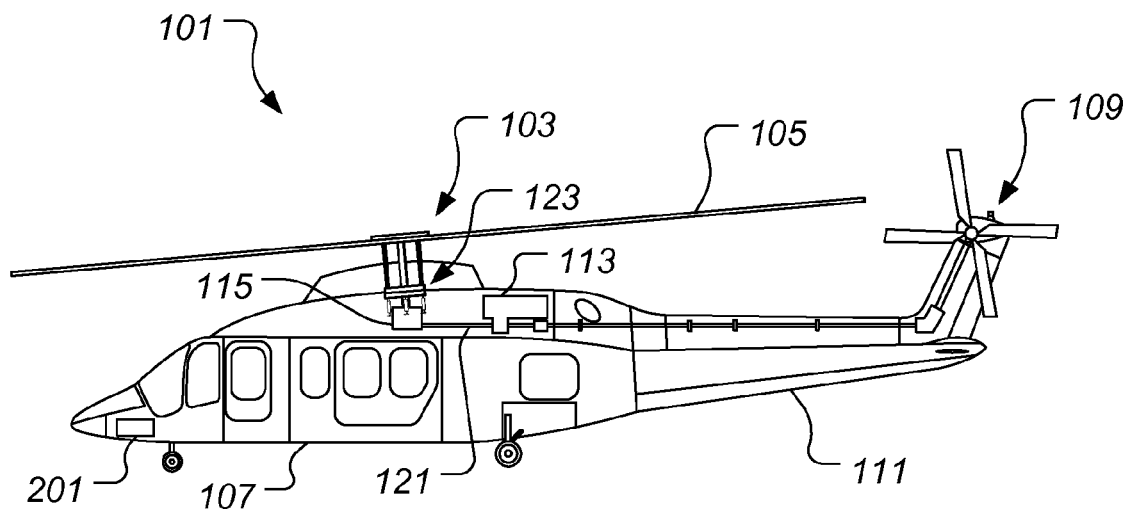
FIG. 1 is a side view of a rotorcraft, according to an example embodiment of the present disclosure.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. For example, a swashplate mechanism 123 can be used to collectively and/or cyclically change the pitch of rotor blades 105. Rotorcraft 101 further includes a fuselage 107, anti-torque system 109, and an empennage 111. Torque is supplied to rotor system 103 and anti-torque system 109 with at least one engine 113. A main rotor transmission 115 is operably associated with an engine main output driveshaft 121 and the main rotor mast. It should be appreciated that even though rotorcraft 101 is depicted as having certain illustrated features, it should be appreciated that rotorcraft 101 can take on a variety of implementation specific configurations, as one of ordinary skill in the art would fully appreciate having the benefit of this disclosure.

System 201 is illustrated in conjunction with rotorcraft 101. It should be appreciated that though system 201 is illustrated with regard to rotorcraft 101, system 201 is equally implementable on other aircraft as well. Further, it should be appreciated that system 201 can be implemented in a wide variety of configurations, depending in part upon the flight control configuration of the rotorcraft.

System 201 is configured for automation of rotorcraft 101 entry into autorotation. System 201 provides a means to assist the flight crew of a rotorcraft in maintaining rotor speed following loss of engine power. The system 201 can automatically adjust control positions, actuator positions or both to prevent excessive loss of rotor speed upon initial loss of engine power before the flight crew is able to react. System 201 goes beyond the existing methods in that it makes use of the ability of a full authority or properly equipped partial authority aircraft flight control system (AFCS) to control the collective pitch of the rotor directly with the swashplate actuators, providing a quicker response than utilizing a trim actuator alone; it uses model matching to provide axis decoupling and yaw anticipation; it includes pitch control initially to assist in preventing rotor deceleration; and it can make use of collective, pitch, roll and yaw trim functions to provide tactile cueing to the pilot to assist when the pilot is in the loop. System 201 can further reduce workload by assisting the flight crew with controlling rotor speed and forward speed during stabilized autorotation. Another unique feature of system 201 is that it contains logic to recognize pilot intent based on input and allows the pilot the ability to override the AFCS actions at any time during the loss of engine power event.

System 201 can monitor engine status information, whether measured directly by the flight control system or received over an interface with the engine system. Upon detection of a loss of engine power, system 201 can manipulate the flight control actuation system, as required for the flight condition, to prevent potentially catastrophic loss of rotor kinetic energy. System 201 can tailor the control response to the measured flight condition. System 201 can make use of all actuation means available to the flight control system to preserve rotor speed, including full authority direct automatic control of main rotor swashplate in pitch, roll and collective and tail rotor collective and high-rate or low-rate parallel actuators in the pitch, roll, collective and directional control axes. System 201 can simultaneously decrease collective pitch and decrease anti-torque input without waiting for a yaw rate to develop. In other words, system 201 is configured to anticipate the decrease in anti-torque requirement when making a decrease in pitch angle of the rotor blades. If required due to high forward airspeed, system 201 can command an aft cyclic input to increase flow through the rotor to prevent excessive loss of rotor RPM and to slow the aircraft toward the autorotation speed. Model-matching techniques can provide a much quicker response than simple proportion integral derivative (PID) controllers used in conventional closed-loop systems. If the flight condition is not appropriate for automatic collective reduction (such as due to proximity to ground), or if the pilot attempts to override the automatic system, system 201 can allow the pilot to control the aircraft and can provide tactile cueing to assist the pilot in retaining rotor speed. During continued autorotation, the flight control system will use rotor actuation, trim and cueing systems to maintain a predefined rotor speed.

In another embodiment, system 201 is configured to provide cyclic control upon loss of the first engine on multi-engine aircraft when operating above the single-engine Vne. This assists the flight crew in quickly returning to the one engine inoperable (OEI) envelope, which is critical should a second engine loss be experienced in rapid succession (fuel contamination, etc.).

System 201 provides a wider pilot recognition window following a loss of power than is provided without system 201. The time is valuable in preventing excessive loss of rotor speed when engine loss occurs while the flight crew is occupied with other tasks, or during high workload due to multiple failure conditions. This is applicable to all rotorcraft, but is particularly valuable for rotorcraft with lower inertia rotors. The system 201 also reduces pilot workload significantly by providing multi-axis inputs during initial entry into autorotation and by providing automatic maintenance of rotor speed, forward speed and attitude throughout the autorotation event.

System 201 can provide a fully available protection system (if supported by the flight control system architecture), and also can provide the capability to tailor the response to the flight condition. System 201 also can provide automatic detection of pilot overriding inputs and allows full control authority to the flight crew when desired. The assistance with maintenance of stabilized autorotation improves safety as the flight crew divides its attention between flying and non-flying tasks while preparing for the subsequent emergency landing.

System 201 is configured to make use of the rotorcraft flight control system to generate commands to the main rotor collective and cyclic control axes and tail rotor collective to assist the pilot in maintaining sufficient rotor speed and aircraft control immediately following loss of all engine power or loss of all remaining engine power on single-engine or multi-engine helicopters. System 201 can be configured to make use of a full-authority Fly-By-Wire (FBW) architecture; a traditional mechanical control system architecture with limited-authority series actuators, full-authority series actuators, low-rate parallel (trim) actuators or any combination of the above; or a mechanical control system with high-rate parallel actuators. For a conventional control system, system 201 is unique in the use of series actuators (either high- or low-authority) in the collective axis. In contrast, conventional systems have utilized low-rate parallel trim actuators in the collective axis.

System 201 can monitor flight conditions and tailor the response following the power loss to the existing flight conditions and power settings. System 201 can reduce main rotor collective pitch, to preserve RPM and adjust tail rotor collective to compensate for decrease in anti torque requirement. Unlike conventional systems, system 201 can make use of direct control of the main rotor collective pitch to provide a more rapid response and tighter closed-loop control of rotor speed. This high-rate control of collective pitch may be provided either inherently in a FBW architecture, through the addition of a high-authority or low-authority series actuator in the collective axis in conventional control architectures or through the use of a high-rate parallel actuator. System 201 can monitor airspeed and, if required for engine failure during high power and high airspeed conditions, can adjust longitudinal cyclic to increase upward airflow through the main rotor, while simultaneously slowing the aircraft toward the autorotation speed. In the case of high power Out-of-Ground-Effect hover conditions, system 201 can pitch the nose down to achieve airspeed suitable for safe autorotation.

System 201 can monitor other flight parameters and inhibits activation of the protection function when not required or when inappropriate (such as when in a landing configuration). Once established in autorotation, system 201 can use collective pitch to maintain a predefined rotor speed and uses cyclic pitch to maintain the most efficient forward speed. System 201 can tailor the commanded response, including RPM, to the flight condition. System 201 can monitor pilot control input and estimate pilot intent to allow override capability, if required. In addition to direct control of the rotors, system 201 can provide tactile cueing in the collective, pitch and roll cyclic and pedal cockpit control axes (if supported by the flight control system architecture) to help the pilot maneuver to and remain within the rotorcraft maneuvering envelope appropriate to the flight condition. In an aircraft with conventional flight control system architecture with only a low-rate parallel trim actuator in the collective axis, system 201 is unique in the use of tactile cueing to assist the pilot while in the loop.

System 201 can also provide the capability to assist the pilot through automatic control or control cueing in the collective, pitch, roll and yaw axes to maneuver to a point within the predefined single-engine maneuvering envelope following loss of an engine in multi-engine rotorcraft. Such a feature can aid in mitigating the potential for aggravating an autorotation condition should loss of a subsequent engine follow the initial engine loss during high power flight conditions. The system 201 can be implemented through the use of conventional PID methods, model-matching methods or other optimal or robust control techniques.

Figure 2:
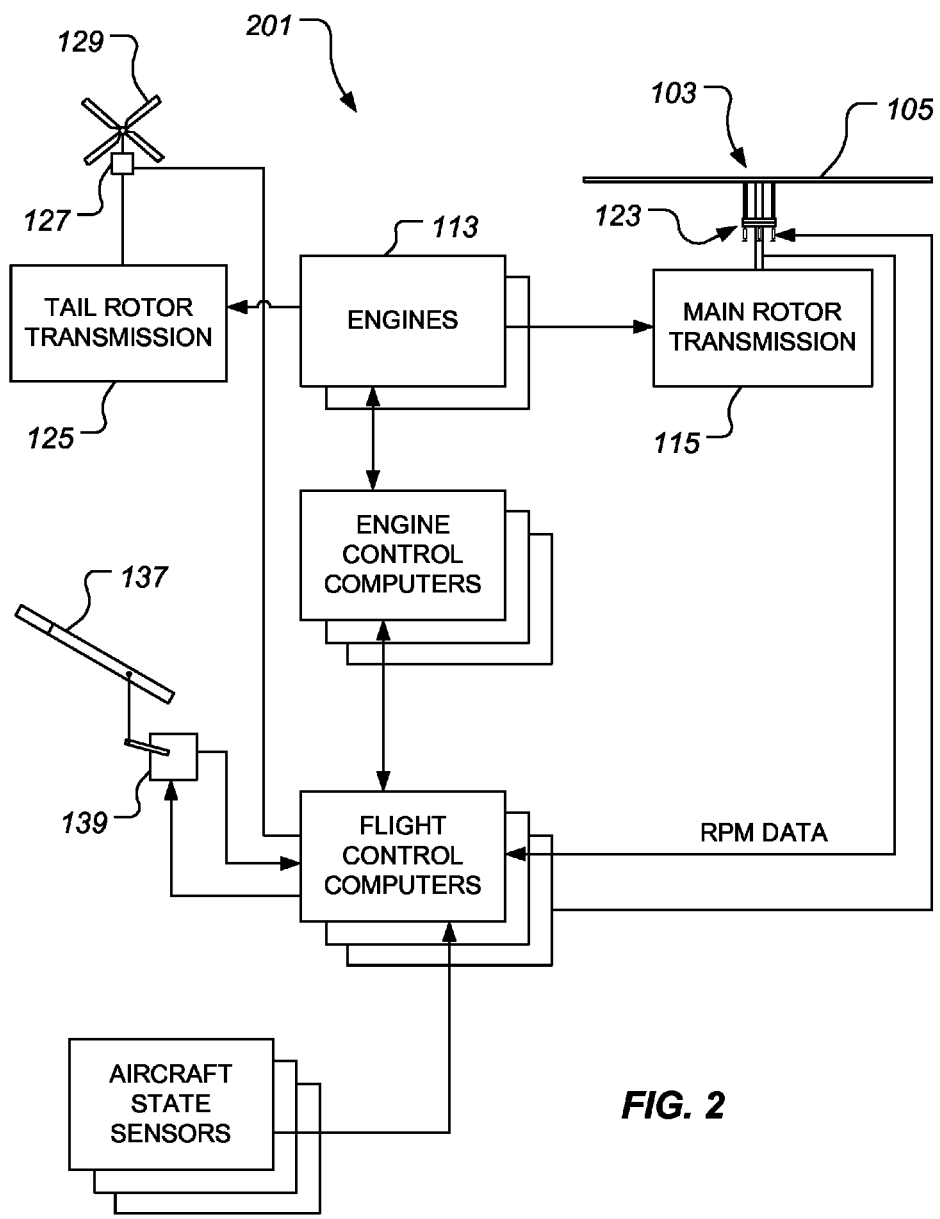
FIG. 2 is a schematic view of a system configured for automation of a rotorcraft entry into autorotation and maintenance of stabilized autorotation, according to an example embodiment of the present disclosure.

Referring also to FIG. 2, system 201 is illustrated in conjunction with various rotorcraft components. System 201 is operable with one or more engines 113 that are mechanically coupled to a tail rotor transmission 125 and main rotor transmission 115. The pitch of tail rotor blades 129 can be collectively changed by a tail rotor actuator 127. The pitch of main rotor blades 105 can be collectively and/or cyclically changed by swashplate mechanism 123. Engines 113 can be controlled by engine control computers 131 that are in communication with one or more flight control computers 133. Flight control computers 133 can take on a wide variety of operational responsibilities. For example, in a fly-by-wire flight control system, flight control computers 133 can analyze pilot inputs and make corresponding commands to engine control computers 131, tail rotor actuator 127, and swashplate mechanism 123. Further, flight control computers 133 are configured to make tactile cueing commands to pilot controls and receive input commands from pilot controls, such as a collective stick 137, with a collective force feel/trim actuator 139. Aircraft state sensors 135 are in communication with flight control computers 133. Illustrative aircraft state sensors 135 can include any variety of sensors configured for measure any variety of rotorcraft systems and rotorcraft environment. For example, aircraft state sensors 135 can includes sensors for measuring: air density, altitude, attitude orientation, yaw orientation, temperature, airspeed, and acceleration, to name a few examples.

System 201 can include software and/or hardware for performing any functionality described herein. For example, system 201 can be embodied partially or wholly within one or more modules within flight control computers 133. Further, system 201 can include any variety of computer systems, as discussed further herein with regard to FIG. 4.

Figure 3:
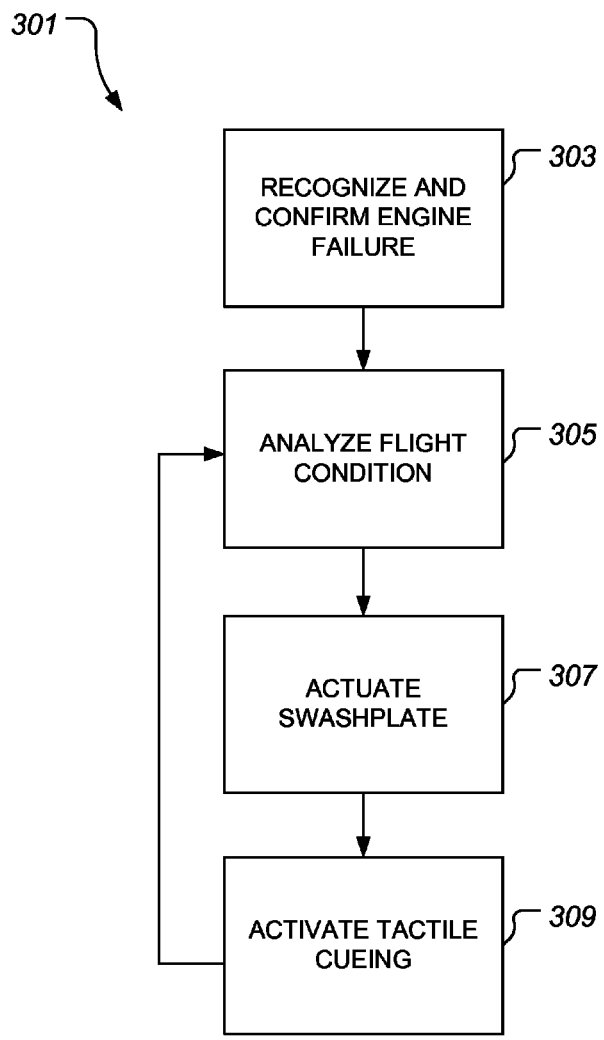
FIG. 3 is a schematic view of a method of automation of rotorcraft entry into autorotation and maintenance of stabilized autorotation, according to an example embodiment of the present disclosure.

Referring now also to FIG. 3, a method 301 for automation of a rotorcraft entry into autorotation and maintenance of stabilized autorotation is schematically illustrated. Method 301 can include a step 303 of recognizing and confirming an engine failure. In the case of a single engine rotorcraft, step 303 includes recognizing and confirming the loss of power of the single engine. In the case of a multi-engine rotorcraft, step 303 includes recognizing and confirming the loss of power of the multiple engines. The recognition of the engine failure can be performed by engine control computers 131 or by independent sensors that measure one or more functions engines 113. The confirmation of the engine failure can be performed by recognizing a droop or decrease in rotor speed, which acts as a failsafe so that subsequent steps of method 301 are not inadvertently performed. It should be appreciated that confirmation of engine failure can be performed by other methods other than recognizing a decrease in rotor speed, for example, an engine torque sensor can be utilized to provide engine failure confirmation.

Method 301 can further include a step 305 of analyzing the flight condition of rotorcraft 101. Step 305 can include processing data from aircraft state sensors 135 so that subsequent actuations of main rotor blades 105 and tail rotor blades 129 take into account the operational state of the aircraft.

Method 301 can further include a step 307 of actuating swashplate mechanism 123. Step 307 can also include actuating tail rotor actuator 127 to collectively change the pitch of tail rotor blades 129 in order to compensate to a decrease in the pitch of main rotor blades 105 that can result in a decrease in required tail rotor thrust. Step 307 includes collectively reducing the pitch of main rotor blades 105 by the flight control computers 133 by making a direct command to the actuators connected to swashplate mechanism 123. The action of making a direct command from flight control computers 133 to the actuators connected to swashplate mechanism 123 increases efficiency and reduces the time required to have an effect on preservation of the rotor speed necessary to achieve an effective autorotation. The degree or amount of decrease in main rotor blade pitch can be initially made and continuously changed in order to achieve and regulate a desired RPM of rotor blades 105, thus, RPM data is continuously being received and processed by flight control computers 133, which thereby makes pitch change commands to the actuators connected to swashplate mechanism 123. The actuation of swashplate mechanism 123 can also entail making a cyclic change to the pitch of main rotor blades 105 in order to cause the rotorcraft to have a desired pitch attitude, which can have a positive effect on airflow up through the rotor disc. For example, a nose up angle of approximately 15 degrees can promote airflow up through the rotor disc, which can have a positive effect on preservation of rotor speed. The cyclic change to the pitch of main rotor blades 105 can be analyzed and commanded by flight control computer 133 which are in communication with aircraft state sensors 135, such as pitch attitude sensors.

Method 301 can include a step 309 that includes activating a tactile cueing to one or more pilot controls. Step 309 can be implemented simultaneous or subsequent to step 307. The tactile cueing in step 309 can include actuation of trim actuator 139 to move collective stick 137 to mimic the pitch changes automatically occurring in main rotor blades 105 by flight control computers 133.

Steps 305 through 309 can be implemented in a recurring loop such that steps 305 through 309 are recurring so as to continuously achieve a desired RPM of rotor blades 105. In an alternative embodiment of method 301, step 307 includes changing the pitch of main rotor blades 105 that will predicatively achieve a target value RPM of rotor blades 105. The predictive algorithm controls collective pitch as a function of flight condition. The algorithm provides for maintenance of RPM immediately following the engine failure and during subsequent changes in flight condition, such as when maneuvering to the proper stabilized autorotation and during the landing flare. Such an embodiment of method 301 can result in a quicker and/or smoother achievement of RPM preservation because the system isn't chasing the desired RPM of rotor blades 105 that could result in a high frequency oscillatory change in rotor blade pitch. The target value of collective pitch position of rotor blades 105 can be chosen by flight control computer 133 that has a look-up table containing desired collective pitch values required to achieve the desired RPM based on flight condition and pilot input. In addition, the target value RPM of rotor blades 105 may be chosen by flight control computer 133 that has a look up table containing desired rotor RPM's for a variety of aircraft states.

System 201 is configured such that the pilot can override the automatic rotor blade pitch changes being implemented in method 301 at any time. Further, system 201 can be configured such that intervention by the pilot only temporarily halts method 301 so that steps 305-309 are automatically performed again after lack of pilot inputs for a period of time. The intervention by the pilot can be implemented simply by the pilot overriding the controls, thus the pilot's causing desired rotor blade control, for example.

Method 301 can also include one or more steps for automating a flare portion of the autorotation procedure. Such steps can include an analysis by flight control computer 133 concluding that the aircraft is within close proximity to the ground so as to automatically increase the pitch of rotor blades 105. Further, system 201 can also be configured such that intervention of method 301 by the pilot below a certain altitude permanently halts the reoccurrence of steps 305-309 because system 201 determines that the pilot is intervening to perform the flare portion of the autorotation.

Figure 4:
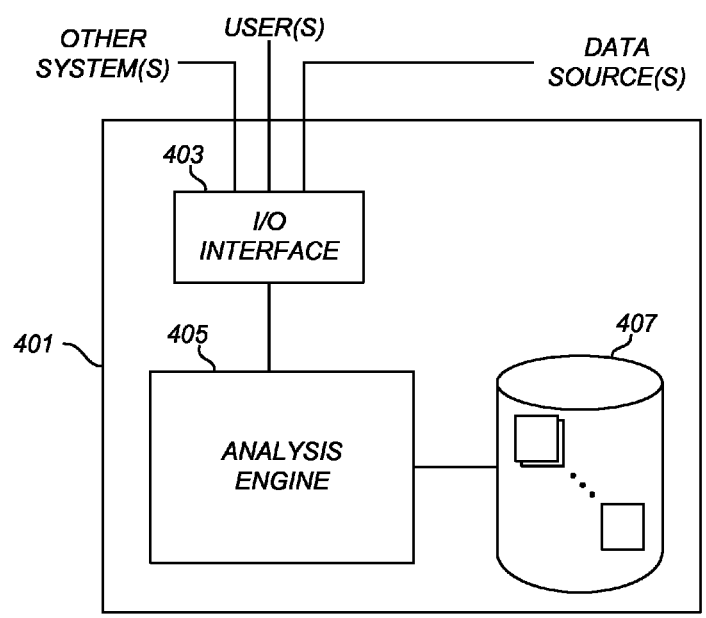
FIG. 4 is a schematic view of a computer system, according to example embodiment of the present disclosure.

Referring now also to FIG. 4, a computer system 401 is schematically illustrated. Computer system 401 can be configured for performing one or more functions with regard to the operation of system 201 and method 301, further disclosed herein. Further, any processing and analysis can be partly or fully performed by computer system 401. Computer system 401 can be partly or fully integrated with other aircraft computer systems.

The system 401 can include an input/output (I/O) interface 403, an analysis engine 405, and a database 407. Alternative embodiments can combine or distribute the input/output (I/O) interface 403, analysis engine 405, and database 407, as desired. Embodiments of the system 401 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 403 can provide a communication link between external users, systems, and data sources and components of the system 401. The I/O interface 403 can be configured for allowing one or more users to input information to the system 401 via any known input device. Examples can include a keyboard, mouse, touch screen, and/or any other desired input device. The I/O interface 403 can be configured for allowing one or more users to receive information output from the system 401 via any known output device. Examples can include a display monitor, a printer, cockpit display, and/or any other desired output device. The I/O interface 403 can be configured for allowing other systems to communicate with the system 401. For example, the I/O interface 403 can allow one or more remote computer(s) to access information, input information, and/or remotely instruct the system 401 to perform one or more of the tasks described herein. The I/O interface 403 can be configured for allowing communication with one or more remote data sources. For example, the I/O interface 403 can allow one or more remote data source(s) to access information, input information, and/or remotely instruct the system 401 to perform one or more of the tasks described herein.

The database 407 provides persistent data storage for system 401. While the term "database" is primarily used, a memory or other suitable data storage arrangement may provide the functionality of the database 407. In alternative embodiments, the database 407 can be integral to or separate from the system 401 and can operate on one or more computers. The database 407 preferably provides non-volatile data storage for any information suitable to support the operation of system 201 and method 301, including various types of data discussed further herein. The analysis engine 405 can include various combinations of one or more processors, memories, and software components.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of automating an autorotation in an aircraft, the method comprising:
recognizing a failure of an engine;
analyzing a flight condition of the aircraft;
actuating a swashplate mechanism with a direct command from a flight control computer to an actuator coupled to the swashplate mechanism so as to change a pitch of a plurality of main rotor blades to a predetermined collective pitch value, the predetermined collective pitch value being chosen by the flight control computer referring to a look-up table containing desired collective pitch values for a variety of aircraft flight conditions; and
temporarily pausing the step of actuating the swashplate for a period of time after a pilot has made an overriding command.

2. The method according to claim 1, further comprising:
confirming the failure of the engine.

3. The method according to claim 1, further comprising:
confirming the failure of the engine by detecting a decrease in rotor speed of the plurality of main rotor blades.

4. The method according to claim 1, further comprising:
calculating a desired rotor speed of the main rotor blades based in part upon the step of analyzing the flight condition of the aircraft.

5. The method according to claim 4, wherein the step of actuating the swashplate mechanism includes changing the pitch of the plurality of main rotor blades to obtain the desired rotor speed.

6. The method according to claim 1, further comprising:
commanding an actuation of a tail rotor actuator with the flight control computer in order to change a pitch of a plurality of tail rotor blades in order to correlate a change in a tail rotor thrust requirement because of a change in pitch of the plurality of main rotor blades.

7. The method according to claim 1, further comprising:
actuating a collective stick with a trim actuator to cue a pilot when the flight control computer has commanded the change to the pitch of the plurality of main rotor blades.

8. The method according to claim 1, wherein the step of actuating the swashplate mechanism with the command from a flight control computer to an actuator coupled to the swashplate mechanism so as to change the pitch of a plurality of main rotor blades includes collectively decreasing the pitch of the plurality of main rotor blades.

9. The method according to claim 1, wherein the step of actuating the swashplate mechanism with the command from a flight control computer to an actuator coupled to the swashplate mechanism so as to change the pitch of a plurality of main rotor blades includes cyclically changing the pitch of the plurality of main rotor blades to increase an attitude of the aircraft so as to promote an airflow up through the plurality of main rotor blades.

10. The method according to claim 1, further comprising:
actuating a swashplate mechanism with a flare command from the flight control computer to the actuator coupled to the swashplate mechanism so as to increase the pitch of the plurality of main rotor blades upon detection that the aircraft is at a predetermined distance from a ground surface.

\* \* \* \* \*